United States Patent
Soulie (10) Patent No.: US 12,129,931 B2
(45) Date of Patent: Oct. 29, 2024

(54) ENCLOSURE CONTAINING AN INERTING GAS AND COMPRISING A LIQUID DISCHARGING SYSTEM, AIRCRAFT HAVING SUCH AN ENCLOSURE

(71) Applicant: Airbus Operations SAS, Toulouse (FR)

(72) Inventor: Adeline Soulie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/972,616

(22) Filed: Oct. 25, 2022

(65) Prior Publication Data
US 2023/0127600 A1   Apr. 27, 2023

(30) Foreign Application Priority Data

Oct. 27, 2021 (FR) ...................... 2111391

(51) Int. Cl.
| | |
|---|---|
| *F16K 17/04* | (2006.01) |
| *F16K 7/17* | (2006.01) |
| *F16K 17/10* | (2006.01) |
| *H01M 8/04746* | (2016.01) |
| *A62C 99/00* | (2010.01) |

(52) U.S. Cl.
CPC ............ *F16K 17/0453* (2013.01); *F16K 7/17* (2013.01); *F16K 17/10* (2013.01); *H01M 8/04746* (2013.01); *A62C 99/0018* (2013.01)

(58) Field of Classification Search
CPC ......... Y10T 137/7808; Y10T 137/7822; Y10T 137/7836; F16K 17/0453; F16K 7/17; F16K 17/10; H01M 8/04746; A62C 99/0018

USPC ......................................................... 137/845
See application file for complete search history.

(56) References Cited

U.S. PATENT DOCUMENTS

| | | | |
|---|---|---|---|
| 3,101,284 A | 8/1963 | Etheridge | |
| 6,089,272 A * | 7/2000 | Brand | F16K 15/144 137/859 |
| 6,182,698 B1 * | 2/2001 | Barak | F16K 15/147 604/83 |

(Continued)

FOREIGN PATENT DOCUMENTS

WO   2018036497 A1   3/2018

OTHER PUBLICATIONS

French Search Report dated May 18, 2022; priority document.

*Primary Examiner* — Jessica Cahill
(74) *Attorney, Agent, or Firm* — Greer, Burns & Crain, Ltd.

(57) ABSTRACT

An enclosure containing an inerting gas and at least one liquid to be discharged. This enclosure comprises at least one orifice positioned in its lower part and a liquid discharging system positioned at the orifice. This liquid discharging system is configured to take up a closed state and an open state in which the system allows the liquid to flow towards the outside of the enclosure and includes at least one element that is elastically deformable depending on the pressure inside the enclosure and, depending on its deformation, controls the open or closed state of the liquid discharging system. This solution makes it possible to achieve simple and automatic regulation of the volume of the liquid in the enclosure, without a sensor. An aircraft including at least one such enclosure is also provided.

10 Claims, 5 Drawing Sheets

(56) References Cited

U.S. PATENT DOCUMENTS

| | | | |
|---|---|---|---|
| 6,237,619 B1* | 5/2001 | Maillefer | F16K 99/0001 |
| | | | 137/859 |
| 9,421,354 B2* | 8/2016 | Carmody | F16K 15/145 |
| 2007/0207354 A1 | 9/2007 | Curello et al. | |
| 2009/0177187 A1* | 7/2009 | Weaver Quigley | F16K 15/147 |
| | | | 137/845 |
| 2012/0248251 A1* | 10/2012 | Tichborne | G01M 3/26 |
| | | | 137/538 |
| 2013/0153605 A1 | 6/2013 | Chen | |
| 2017/0370260 A1 | 12/2017 | Bardin et al. | |
| 2018/0353977 A1 | 12/2018 | Nijdam et al. | |

* cited by examiner

ENCLOSURE CONTAINING AN INERTING GAS AND COMPRISING A LIQUID DISCHARGING SYSTEM, AIRCRAFT HAVING SUCH AN ENCLOSURE

CROSS-REFERENCES TO RELATED APPLICATIONS

This application claims the benefit of the French patent application No. 2111391 filed on Oct. 27, 2021, the entire disclosures of which are incorporated herein by way of reference.

FIELD OF THE INVENTION

The present application relates to an aircraft comprising at least one hydrogen supply device and at least one sealed container sealed from the air outside the container, in which at least one item of equipment of the hydrogen supply device is positioned.

BACKGROUND OF THE INVENTION

According to one embodiment, a fuel cell is connected to a first, hydrogen supply duct, to a second, oxygen supply duct, to a third, water discharging duct, to a fourth, cooling liquid supply duct, and to a fifth, cooling liquid discharging duct.

These different ducts pass through an enclosure that is joined to the fuel cell and contains an inerting gas, for example nitrogen, maintained at a given pressure. The inerting gas makes it possible, in the event of a hydrogen leak, to limit the risks of an outbreak of fire and of an explosion, which could occur in the event of contact between hydrogen and oxygen in the enclosure. This enclosure is equipped with a sensor configured to detect a concentration of hydrogen greater than a given threshold, and a valve configured to cut the supply of hydrogen when the hydrogen concentration detected by the sensor is greater than the given threshold.

In operation, water coming from the third duct or cooling liquid coming from one of the fourth or fifth ducts may leak and accumulate in the lower part of the enclosure. Above a certain volume, these liquids need to be discharged from the enclosure.

It is problematic to discharge the liquids that have accumulated in the lower part of the enclosure without losing inerting gas.

The present invention aims to provide a solution to this problem.

SUMMARY OF THE INVENTION

To this end, a subject of the invention is an enclosure delimiting an internal zone and an external zone, containing fluids in the form of an inerting gas and of at least one liquid to be discharged, the external zone exhibiting an external pressure, the internal zone exhibiting an internal pressure greater than the external pressure, the enclosure comprising a lower part in which the liquid accumulates, at least one orifice positioned in the lower part and configured to place the internal and external zones in communication, and a liquid discharging system positioned at the orifice and configured to take up a closed state in which the liquid discharging system prevents the liquid from flowing from the internal zone to the external zone through the orifice and an open state in which the liquid discharging system allows the liquid to flow from the internal zone to the external zone through the orifice.

According to the invention, the liquid discharging system comprises at least one elastically deformable element configured to be deformed by the internal pressure of the internal zone of the enclosure and, depending on its deformation, to control the open or closed state of the liquid discharging system.

This solution makes it possible to achieve simple and automatic regulation of the volume of liquid in the enclosure, without losing inerting gas.

According to a first embodiment, the deformable element is a deformable membrane closing off the orifice and having at least one perforation passing through it, the deformable membrane being configured to deform depending on the internal pressure of the internal zone and to take up a non-deformed state and a deformed state in which the deformable membrane is stretched in the direction of the external zone of the enclosure, the deformable membrane being configured such that the perforation takes up a closed-off state when the deformable membrane is in the non-deformed state or when the deformable membrane is in the deformed state and the internal pressure of the internal zone of the enclosure is lower than a given first threshold pressure and an open state when the deformable membrane is in the deformed state and the internal pressure of the internal zone of the enclosure is greater than or equal to the first given threshold pressure.

According to another feature, the deformable membrane is configured such that the perforation remains in the open state as long as the internal pressure of the internal zone of the enclosure remains greater than a second given threshold pressure, lower than the first given threshold pressure, and returns to the closed-off state as soon as the internal pressure of the internal zone of the enclosure is equal to or lower than the second given threshold pressure.

According to another feature, the deformable membrane comprises a peripheral edge exhibiting a cross section larger than the cross section of the orifice and an overlapping zone pressed against the enclosure. In addition, the at least one perforation of the deformable membrane is positioned in the overlapping zone so as to be closed off by the enclosure when the deformable membrane is in the non-deformed state and when the deformable membrane is in the deformed state and the internal pressure of the internal zone of the enclosure is lower than the first given threshold pressure, the perforation being at least partially positioned in line with the orifice when the deformable membrane is in the deformed state and the internal pressure of the internal zone of the enclosure is greater than or equal to the first given threshold pressure.

According to another feature, the at least one perforation of the deformable membrane is positioned in line with the orifice when the deformable membrane takes up the non-deformed state, the perforation having:

a zero cross section that does not allow the passage of the fluids contained in the enclosure when the deformable membrane is in the non-deformed state, a non-zero cross section that allows the passage of the liquid when the deformable membrane is in the deformed state and the internal pressure of the internal zone of the enclosure is greater than or equal to the first given threshold pressure.

According to another feature, the deformable membrane comprises a plurality of perforations passing through the deformable membrane, the perforations being distributed in a circle that is substantially centered with respect to the orifice.

According to another feature, the deformable membrane is made of elastomer.

According to another embodiment, the liquid discharging system comprises a check valve that is movable between a closed position in which the check valve closes off the orifice and an open position in which the check valve is spaced apart from the enclosure and allows the liquid to flow towards the external zone of the enclosure. In addition, the elastically deformable element is a return element configured to keep the check valve in the closed position as long as the internal pressure of the internal zone of the enclosure is lower than a first given threshold pressure, and to allow the check valve to move into the open position as soon as the internal pressure of the internal zone of the enclosure is greater than or equal to the first given threshold pressure.

According to another feature, the return element is configured such that the check valve remains in the open position as long as the internal pressure of the internal zone of the enclosure is greater than a second given threshold pressure lower than the first given threshold pressure and such that the check valve returns to the closed position as soon as the internal pressure of the internal zone of the enclosure is lower than or equal to the second given threshold pressure.

A further subject of the invention is an aircraft comprising at least one enclosure according to one of the preceding features.

BRIEF DESCRIPTION OF THE DRAWINGS

Further features and advantages will become apparent from the following description of the invention, which is given only by way of example, with reference to the appended drawings, in which.

DETAILED DESCRIPTION OF THE PREFERRED EMBODIMENTS

Figure 1:
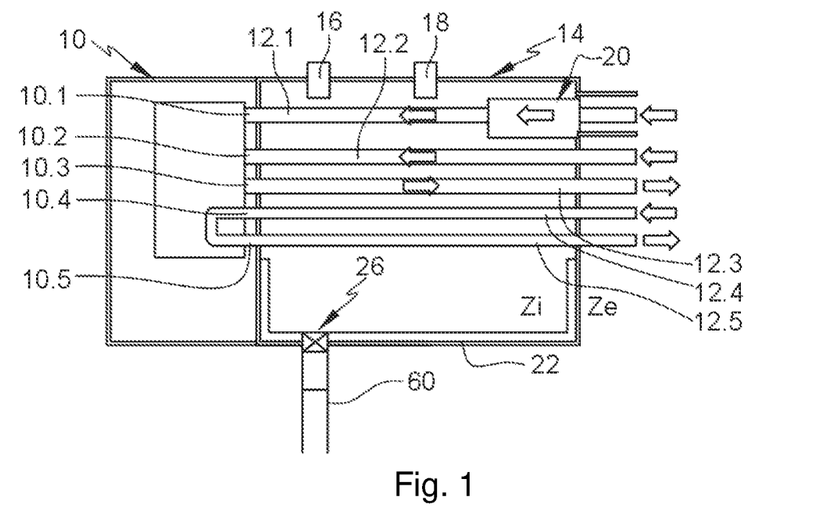
FIG. 1 is a schematic cross section through a fuel cell and a container containing an inerting gas and comprising a liquid discharging system.

According to one embodiment, shown in FIG. 1, a fuel cell 10 comprises at least one first orifice 10.1 connected to a first, hydrogen supply duct 12.1 (for example for hydrogen gas), at least one second orifice 10.2 connected to a second, oxygen supply duct 12.2 (for example for oxygen gas), at least one third orifice 10.3 connected to a third, water discharging duct 12.3, at least one fourth orifice 10.4 connected to a fourth, cooling liquid supply duct 12.4, and at least one fifth orifice 10.5 connected to a fifth, cooling liquid discharging duct 12.5.

At least one portion of each of the first, second, third, fourth and fifth ducts 12.1 to 12.5 is positioned in an enclosure 14.

According to one configuration, this enclosure 14 is joined to the fuel cell 10 and has a parallelepipedal shape. Of course, the invention is not limited to this configuration. Thus, the enclosure 14 may be spaced apart from the fuel cell 10 and may have different shapes and dimensions. By way of example, the enclosure 14 may be a tube through which the first, second, third, fourth and fifth ducts 12.1 to 12.5 pass.

This enclosure 14 contains an inerting gas. A or the inerting gas is understood to be an inerting gas or a mixture of gases including at least one inerting gas. An inerting gas is an inert gas. By way of example, the inerting gas is nitrogen.

During operation, the inerting gas exhibits a given pressure Pi which needs to be kept higher than a given threshold.

The enclosure 14 comprises at least one connecting system 16 configured to connect an inerting gas supply duct so as to fill the enclosure 14 with inerting gas.

According to one embodiment, the enclosure 14 is equipped with a sensor 18 configured to detect a concentration of hydrogen greater than a given threshold, and a valve 20 for cutting the supply of hydrogen when the concentration of hydrogen detected by the sensor 18 is greater than the given threshold. Of course, the invention is not limited to this equipment for the enclosure 14.

Regardless of the embodiment, the enclosure delimits an internal zone Zi and an external zone Ze, the external zone exhibiting an external pressure, the internal zone Zi exhibiting an internal pressure (pressure in the internal zone Zi) greater than the external pressure. This enclosure 14 is configured so as not to deform in spite of the pressure difference between the external and internal pressure, for example as long as the internal pressure remains less than twenty times the external pressure.

The enclosure 14 comprises an internal face F14 oriented towards the internal zone Zi and an external face F14' oriented towards the external zone Ze.

The enclosure 14 comprises a lower part 22 in which at least one liquid 24 accumulates under gravity, in particular in the event of a leak. According to a first configuration, the lower part 22 of the enclosure 14 is substantially planar and horizontal.

According to another configuration, the lower part 22 of the enclosure 14 has at least one bottom point at which the liquid 24 accumulates under gravity, first and foremost.

According to one application, an aircraft comprises at least one enclosure 14 which is joined to a fuel cell 10 and through which five ducts 12.1 to 12.5 pass. Of course, the invention is not limited to this application. Thus, the enclosure 14 could be used in other technical fields, have different configurations and comprise only one duct.

Regardless of the embodiment, the enclosure 14 contains an inerting gas and, under certain circumstances, for example in the event of a leak, at least one liquid 24 that accumulates against a lower part 22 of the enclosure 14. The inerting gas is at a predetermined pressure, which is greater than the external pressure. Starting from a certain volume, the liquid 24 needs to be discharged to the outside of the enclosure 14.

In the following, the term liquid is understood to mean a liquid or a mixture of liquids. This liquid 24 may be flammable. This liquid 24 has a density greater than that of the inerting gas.

The enclosure 14 comprises at least one orifice 28, passing through it, for placing the internal and external zones Zi, Ze in communication. This orifice 28 is positioned in the lower part 22 of the enclosure 14 to make it possible to discharge the liquid 24 from the enclosure 14 under gravity. When there is a bottom point, the orifice 28 is positioned at the bottom point.

This orifice 28 has a diameter D28. The enclosure 14 has a rim 30 surrounding the orifice 28.

The enclosure 14 comprises a liquid discharging system 26, positioned at the orifice 28, for controlling the flow of the liquid 24 via the orifice 28. Since the liquid discharging system 26 is positioned in the lower part 22 or at a bottom point when there is a bottom point, even when there is a small volume of liquid, the liquid discharging system 26 is isolated from the inerting gas by the liquid 24.

According to a first embodiment, shown in FIGS. 2 to 5, the liquid discharging system 26 comprises a deformable membrane 32 that is positioned so as to close off the orifice 28 and is connected to the enclosure 14, all around the orifice 28, so as to be fluid-tight (with respect to gas and liquid). Thus, whether liquid 24 is present or not, the enclosure 14 is gas-tight.

The deformable membrane 32 comprises a peripheral edge 32.1 which has a diameter D32 greater than the diameter D28 of the orifice 28. In one arrangement, the peripheral edge 32.1 and the orifice 28 are substantially concentric. In a variant, it is possible for the orifice 28 and the deformable membrane 32 not to be circular. In that case, the deformable membrane 32 has a cross section larger than that of the orifice 28.

Figure 2:
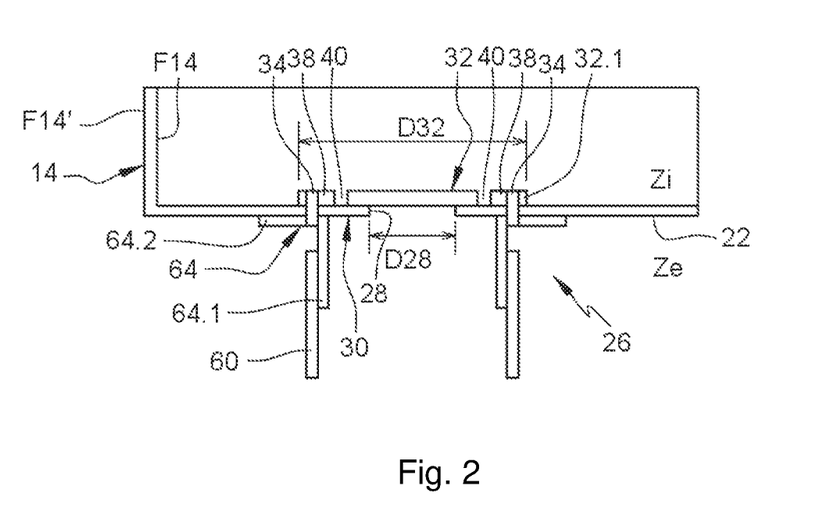
FIG. 2 is a schematic cross section through a liquid discharging system illustrating a first embodiment of the invention, without liquid to be discharged.
Figure 3:
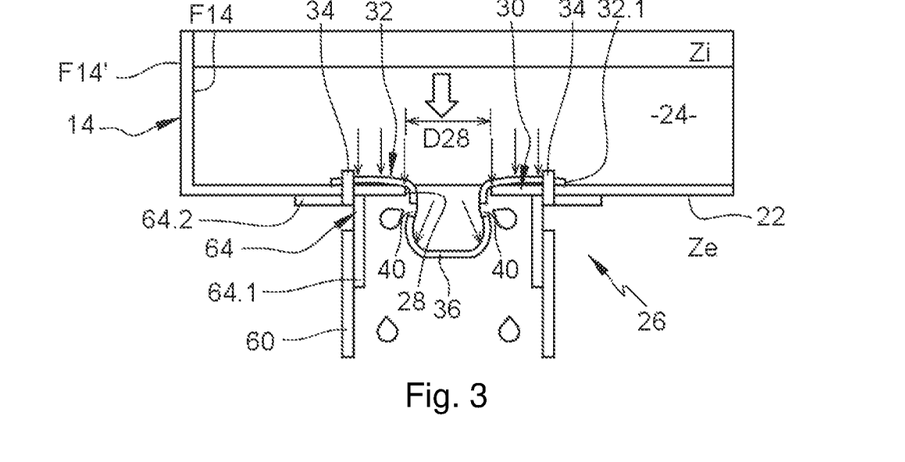
FIG. 3 is a schematic cross section of the liquid discharging system shown in FIG. 2, with liquid to be discharged.

In one arrangement, the deformable membrane 32 is connected to the enclosure by connecting elements 34 distributed around its circumference. The deformable membrane 32 may be connected to the enclosure 14, around the orifice 28, by any other means.

Figure 5:
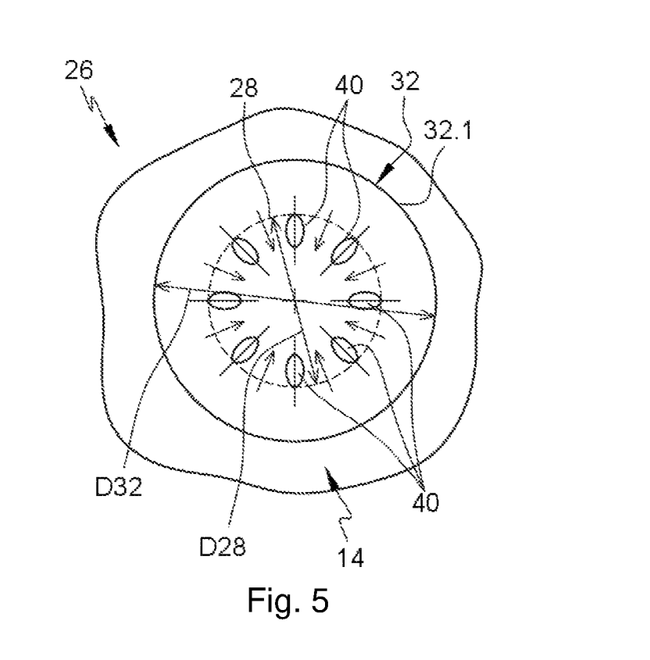
FIG. 5 is a top view of the deformable membrane shown in FIG. 4, with liquid to be discharged.

The deformable membrane 32 is configured to deform elastically and to take up a non-deformed state, shown in FIG. 2, in which it is substantially planar and not stretched, and a deformed state, shown in FIG. 3, in which it has been stretched in the direction of the external zone Ze of the enclosure 14 and forms a pouch 36 in which the liquid 24 is present. On passing from the non-deformed state to the deformed state, the deformable membrane 32 stretches radially in the direction of its center, as illustrated in FIG. 5.

The deformable membrane 32 passes from the non-deformed state to the deformed state on account of the increase in the internal pressure of the internal zone Zi of the enclosure 14 caused by the accumulation of liquid 24.

Thus, in the absence of liquid 24, as illustrated in FIG. 2, the internal pressure of the internal zone Zi is substantially equal to the pressure Pi of the inerting gas. In the event of a leak, as illustrated in FIG. 4, the volume of liquid 24 in the enclosure 14 increases, reducing the volume for the inerting gas and resulting in the internal pressure of the internal zone Zi increasing.

The deformable membrane 32 comprises, in the non-deformed state, an overlapping zone 38 that is situated between the peripheral edge 32.1 and the orifice 28 and is pressed against the rim 30 of the enclosure 14. In one configuration, the overlapping zone 38 is pressed against the internal face F14 of the enclosure 14. In a variant, it could be pressed against the external face F14'.

On account of the stretching of the deformable membrane 32, in the deformed state, the overlapping zone 38 extends partially in line with the orifice 28.

Figure 4:
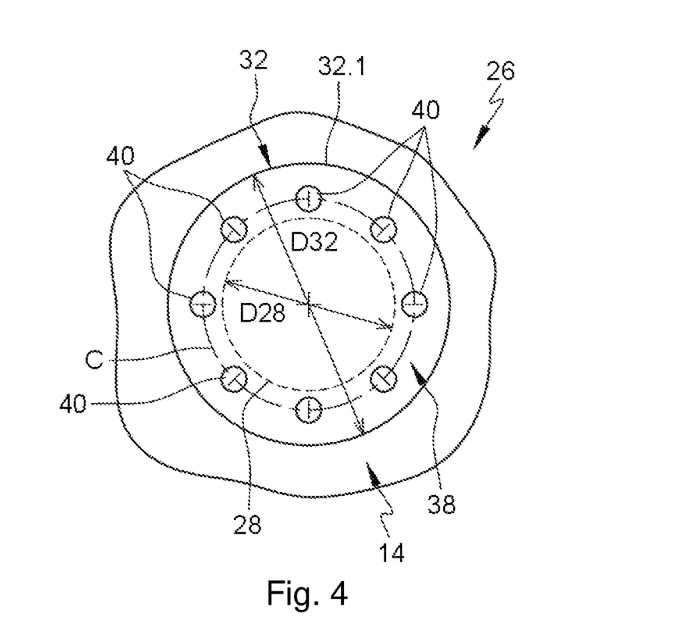
FIG. 4 is a top view of a deformable membrane of a liquid discharging system, illustrating a first embodiment, without liquid to be discharged.

According to the first embodiment, shown in FIGS. 2 to 5, the deformable membrane 32 comprises at least one perforation 40 that passes through the deformable membrane 32 and is positioned in the overlapping zone 38 so as to be closed off by the enclosure 14, and more particularly by the rim 30, when the deformable membrane 32 is in the non-deformed state, as illustrated in FIGS. 2 and 4, and in an insufficiently deformed state, the perforation 40 being at least partially positioned in line with the orifice 28 and opening when the deformable membrane 32 reaches a given level of deformation, as illustrated in FIGS. 3 and 5. An "insufficiently deformed state" of the deformable membrane 32 is understood as meaning that the deformable membrane 32 is in the deformed state but the internal pressure of the internal zone Zi of the enclosure 14 is lower than a first given threshold pressure, corresponding to a first given threshold volume for the liquid 24. The given level of deformation of the deformable membrane 32 corresponds to the deformed state of the deformable membrane 32 when the internal pressure of the internal zone Zi of the enclosure 14 becomes greater than the first given threshold pressure.

Since the deformed state of the deformable membrane 32 is substantially proportional to the internal pressure of the internal zone Zi of the enclosure 14, the deformable membrane 32 is configured such that the perforation 40 takes up a closed-off state when the deformable membrane 32 is in the non-deformed state or when the deformable membrane 32 is in an insufficiently deformed state, meaning that the deformable membrane 32 is in the deformed state but the internal pressure of the internal zone Zi of the enclosure 14 is lower than the first given threshold pressure, and an open state when the deformable membrane 32 is in the deformed state and the internal pressure of the internal zone Zi of the enclosure 14 is greater than or equal to the first given threshold pressure. In other words, the perforation 40 is dimensioned so as to be closed off when the deformable membrane 32 is in the non-deformed state or in an insufficiently deformed state, and to allow the liquid 24 to pass through when the deformable membrane 32 is in the deformed state and has reached the given level of deformation.

Thus, the deformable membrane 32, and therefore the perforation 40, and the enclosure 14, and therefore the orifice 28 and the rim 30, are dimensioned such that the perforation 40 is closed off when the deformable membrane 32 is in the non-deformed state or in an insufficiently deformed state, and allows the liquid 24 to pass through when the deformable membrane 32 has reached the given level of deformation.

When the liquid 24 has been discharged, its volume inside the enclosure 14 decreases and so the internal pressure of the internal zone Zi of the enclosure 14 decreases.

The deformable membrane 32 is configured such that the perforation 40 remains in the open state as long as the internal pressure of the internal zone Zi of the enclosure 14 remains greater than a second given threshold pressure, which is lower than the first given threshold pressure, and returns to the closed-off state as soon as the internal pressure of the internal zone Zi of the enclosure 14 is equal or lower than the second given threshold pressure. This second given threshold pressure corresponds to a second given threshold volume for the liquid 24 that is lower than the first given threshold volume. Thus, during operation, the liquid discharging system 26 allows the liquid 24 to flow towards the external zone Ze of the enclosure 14 as soon as its volume in the enclosure 14 reaches the first given threshold volume, and prevents the liquid 24 from flowing as soon as its volume becomes equal to or lower than the second given threshold volume again.

Since the liquid discharging system 26 is always separated from the inerting gas by the liquid 24 when its volume is between the first and second given threshold volumes, the inerting gas does not escape from the enclosure 14 while the liquid 24 is being discharged. Thus, its volume and its pressure remain constant.

This solution makes it possible to achieve simple and automatic regulation of the volume of liquid 24 in the enclosure 14, without a sensor and without losing inerting gas.

According to one configuration, the perforation 40 has a circular cross section with a non-zero diameter when the deformable membrane 32 is in the non-deformed state, as illustrated in FIG. 4. This perforation 40 has an elongate shape, oriented radially, when the deformable membrane 32 is in the deformed state, as illustrated in FIG. 5.

In one arrangement, when the deformable membrane 32 is in the deformed state, the perforation 40 is separated from the orifice 28 by a distance of the order of a few millimeters.

According to one embodiment, the deformable membrane 32 comprises a plurality of perforations 40, as illustrated in FIGS. 4 and 5. In one arrangement, the perforations 40 are regularly distributed in a circle C which is substantially centered with respect to the orifice 28 and has a diameter greater than the diameter D28 of the orifice when the deformable membrane 32 is in the non-deformed state.

According to one embodiment, the deformable membrane 32 is made of elastomer and has a thickness of the order of a few millimeters. The thickness and/or the material of the deformable membrane 32 are chosen depending in particular on the first and second desired given threshold pressures.

Figure 6:
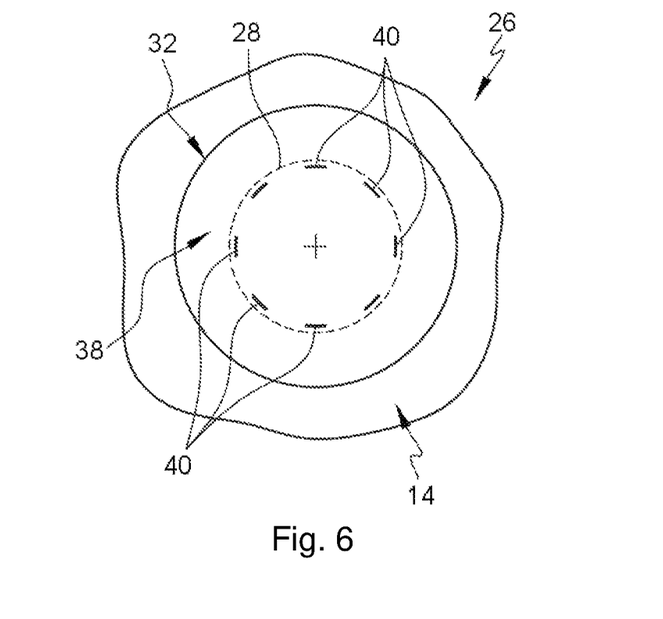
FIG. 6 is a top view of a deformable membrane of a liquid discharging system, illustrating a second embodiment, without liquid to be discharged.
Figure 7:
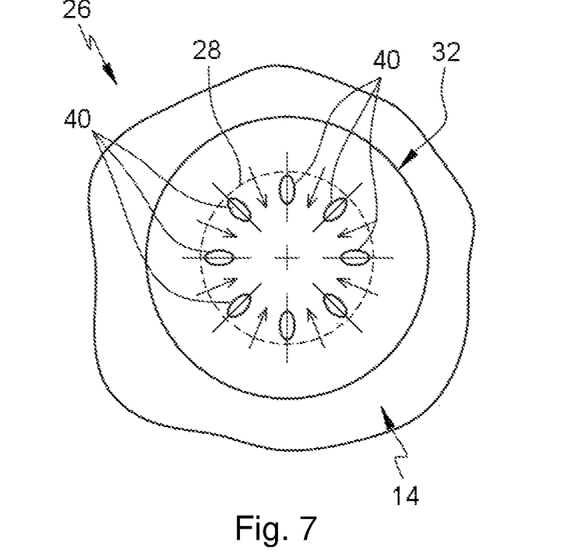
FIG. 7 is a top view of the deformable membrane shown in FIG. 6, with liquid to be discharged.

According to a second embodiment, shown in FIGS. 6 and 7, which is similar to the first embodiment, the perforations 40 are not necessarily positioned in the overlapping zone 38. Thus, the deformable membrane 32 may comprise at least one perforation 40 positioned in line with the orifice 28 when the deformable membrane 32 is in the non-deformed state, the perforation 40 having:
  a zero cross section that does not allow (i.e., prevents) the passage of the fluids present in the enclosure 14 when the deformable membrane 32 is in the non-deformed state,
  a non-zero cross section that does not allow the passage of the liquid 24 when the deformable membrane 32 is in an insufficiently deformed state,
  a non-zero cross section that allows the passage of the liquid 24 when the deformable membrane 32 is stretched and has reached a deformed state corresponding to the given level of deformation.

According to this second embodiment, the deformable membrane 32 may be pressed against the internal face F14 of the enclosure 14, against its external face F14' or be positioned between the internal and external faces.

Just like the first embodiment, the deformable membrane 32 is configured such that:
  the perforation 40 takes up a closed-off state as long as the internal pressure of the internal zone Zi of the enclosure 14 is lower than a first given threshold pressure corresponding to a first given threshold volume for the liquid 24, and an open state for the liquid 24 when the internal pressure of the internal zone Zi of the enclosure 14 is greater than or equal to the first given threshold pressure, and
  the perforation 40 remains in the open state for the liquid 24 as long as the internal pressure of the internal zone Zi of the enclosure 14 remains greater than a second given threshold pressure, lower than the first given threshold pressure, and returns to the closed state (i.e., to a blocking state) for the liquid 24 as soon as the internal pressure of the internal zone Zi of the enclosure 14 is equal to or lower than the second given threshold pressure.

According to this second embodiment, when the deformable membrane 32 is in the non-deformed state, the perforation 40 is in the form of a slot, curved or rectilinear, oriented substantially perpendicularly to a radial direction.

Just like the first embodiment, the deformable membrane 32 may comprise a plurality of perforations 40 positioned in line with the orifice 28 when the deformable membrane 32 is in the non-deformed state. In one arrangement, the perforations 40 are regularly distributed in a circle which is substantially centered with respect to the orifice 28 and has a diameter smaller than the diameter D28 of the orifice 28 when the deformable membrane 32 is in the non-deformed state.

Figure 8:
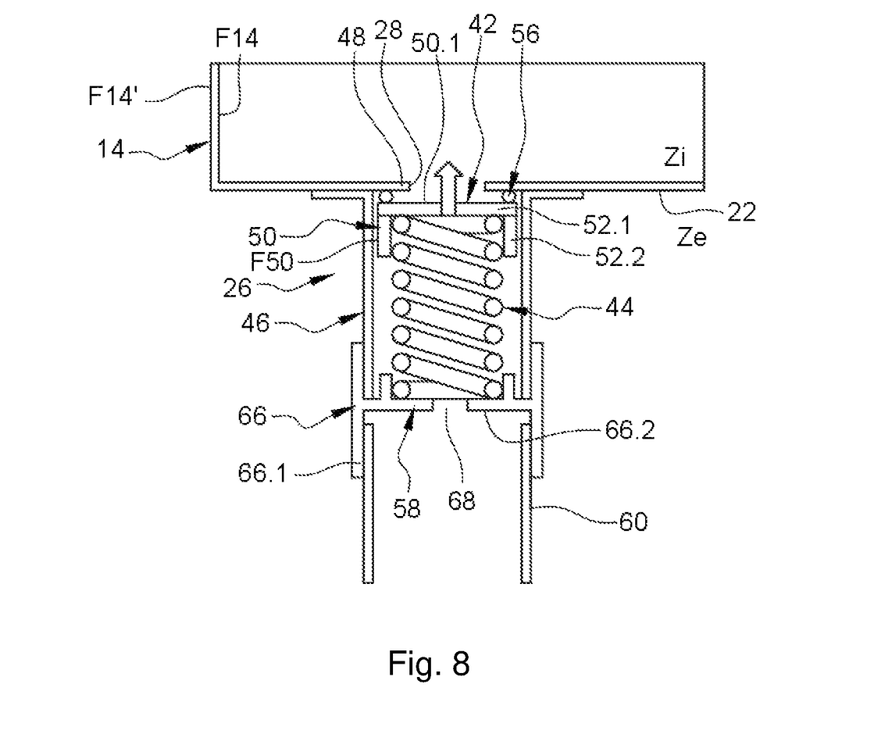
FIG. 8 is a schematic cross section through a liquid discharging system, illustrating a third embodiment of the invention, without liquid to be discharged.
Figure 9:
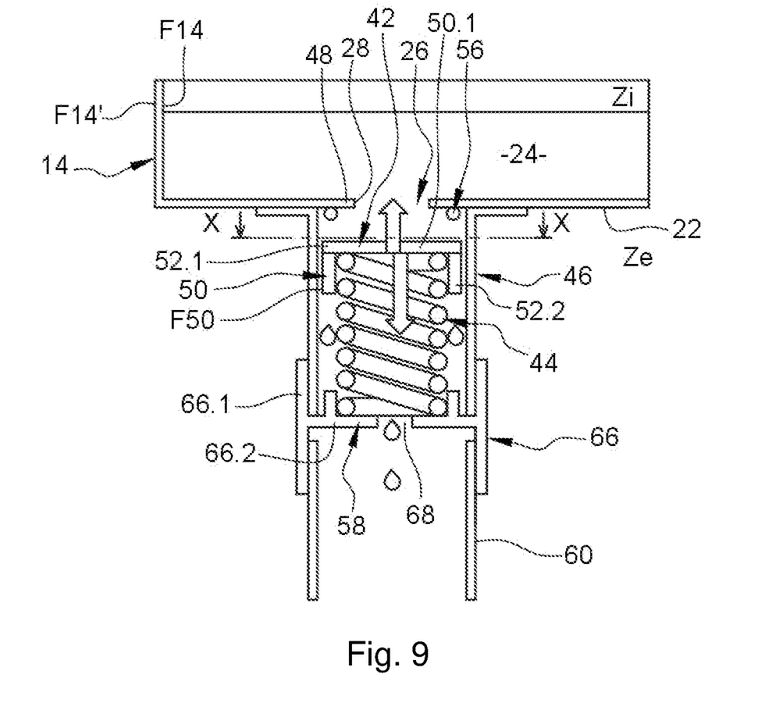
FIG. 9 is a schematic cross section through the liquid discharging system shown in FIG. 8, with liquid to be discharged.
Figure 10:
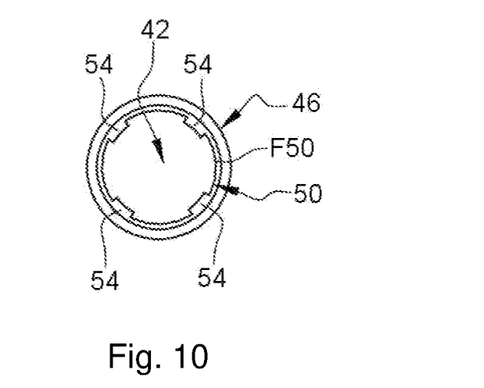
FIG. 10 is a cross section on the line X-X in FIG. 9.

According to a third embodiment, shown in FIGS. 8 to 10, the liquid discharging system 26 comprises:
  a check valve 42 that is movable between a closed position in which it closes off the orifice 28 and an open position in which the check valve 42 is spaced apart from the enclosure 14 and allows the liquid 24 to flow towards the external zone Ze of the enclosure 14,
  a return element 44 configured to keep the check valve in the closed position, as illustrated in FIG. 8, as long as the internal pressure of the internal zone Zi of the enclosure 14 is lower than a first given threshold pressure, and to allow the check valve 42 to move into the open position, as illustrated in FIG. 9, as soon as the internal pressure of the internal zone Zi of the enclosure 14 is greater than or equal to the first given threshold pressure.

According to one configuration, the return element 44 is configured such that the check valve 42 remains in the open position as long as the internal pressure of the internal zone Zi of the enclosure 14 is greater than a second given threshold pressure and such that the check valve 42 returns to the closed position as soon as the internal pressure of the internal zone Zi of the enclosure 14 is lower than or equal to the second given threshold pressure, the latter being lower than the first given threshold pressure.

In one arrangement, the liquid discharging system 26 comprises a tube 46 positioned in the external zone Ze. This tube 46 extends between a first end connected to the enclosure 14 and a second end. This tube 46 has an inside diameter greater than the diameter D28 of the orifice 28 and is positioned in a centered manner with respect to the orifice 28 such that the enclosure 14 has a rim 48 all around the orifice 28 inside the tube 46.

According to one embodiment, the check valve 42 comprises a piston 50, which is movable in the tube 46 and has an end face 50.1 oriented towards the enclosure 14 and in contact with the liquid 24. According to one embodiment, the piston 50 comprises a disc 52.1 and a tubular portion 52.2 pressed against one of the faces of the disc 52.1 and connected to this face. The disc 52.1 and the tubular portion 52.2 have one and the same outside diameter equal to or slightly smaller than the inside diameter of the tube 46. Thus, the piston 50 can slide in the tube 46. The piston 50 comprises a lateral face F50 facing the internal face of the tube 46, this lateral face F50 corresponding to the external face of the tubular portion 52.2 and to the peripheral edge face of the disc 52.1. The piston 50 comprises at least one groove 54 positioned on the lateral face F50 of the piston 50, allowing the liquid 24 to flow between the tube 46 and the piston 50.

In an arrangement shown in FIG. 10, the piston 50 comprises four grooves 54 distributed around the circumference of the piston 50. Each groove 54 is dimensioned so as not to communicate with the internal zone Zi of the enclosure 14 when the check valve 42 is in the closed position.

According to one embodiment, the return element 44 comprises at least one spring, which has an outside diameter smaller than the inside diameter of the tubular portion 52.2 of the piston 50 so as to be partially accommodated in this tubular portion 52.2.

The characteristics of the return element 44 and in particular of the spring are chosen depending on the first and second desired given threshold pressures.

According to one configuration, the liquid discharging system 26 comprises a seal 56 positioned at the rim 48, around the orifice 28, which is configured to be compressed between the check valve 42 and the rim 48 when the check valve 42 is in the closed position.

The liquid discharging system 26 comprises a stop 58 which is positioned at the second end of the tube 46 and against which the return element 44 bears. The return element 44 is thus positioned between the check valve 42, more specifically the disc 52.1, and the stop 58.

According to one embodiment, the liquid discharging system 26 comprises at least one discharging duct 60 for channeling the liquid 24. This discharging duct 60 may be rigid or flexible. According to a first configuration, which is not shown, the discharging duct 60 has a first end directly connected to the enclosure 14 and, at this first end, a cross section greater than or equal to that of the orifice 28. According to another configuration, shown in FIGS. 2 and 3, the liquid discharging system 26 comprises a connector 64 connecting the first end of the discharging duct 60 and the enclosure 14. This connector 64 comprises a tubular part 64.1 connected to the discharging duct 60, and a flange 64.2 pressed against the enclosure 14 and connected to the latter by connecting elements. According to another configuration, shown in FIGS. 8 and 9, the liquid discharging system 26 comprises a connector 66 connecting the tube 46 and the discharging duct 60 and having a tubular body 66.1, which extends between a first end, in which the tube 46 is fitted, and a second end, in which the discharge duct 60 is fitted, and a transverse wall 66.2 which has at least one through-orifice 68 for allowing the liquid 24 to flow and which acts as a stop 58 for the return element 44.

The invention is not limited to the embodiments shown in FIGS. 2 to 10. Thus, regardless of the embodiment, the liquid discharging system 26 is configured to take up a closed state in which it prevents the liquid 24 from flowing from the internal zone Zi towards the external zone Ze, and an open state in which it allows the liquid 24 to flow from the internal zone Zi towards the external zone Ze, and comprises at least one elastically deformable element, either the deformable membrane 32 or the return element 44, configured to be deformed by the pressure of the internal zone Zi of the enclosure 14 and, depending on its deformation, to control the open or closed state of the liquid discharging system 26, the latter being position so as to be isolated from the inerting gas by the liquid 24 when a liquid 24 is present in the enclosure 14.

This solution makes it possible to obtain simple and automatic regulation of the volume of the liquid 24 in the enclosure 14, without a sensor and without losing inerting gas.

The first embodiment makes it possible to obtain a liquid discharging system 26 from a single part, the deformable membrane 32, without parts that are movable with respect to one another as in the second embodiment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An enclosure delimiting an internal zone and an (Currently Amended) external zone, containing fluids as an inerting gas and at least one liquid to be discharged, the external zone exhibiting an external pressure, the internal zone exhibiting an internal pressure greater than the external pressure, the enclosure comprising at least a first end and a second end opposite to said first end, and:
　at least two conduits extending through the first and second opposite ends of the enclosure, wherein at least a portion of each conduit is positioned in the enclosure, wherein at least one of the conduits is configured to carry a liquid,
　a lower part in which the liquid accumulates,
　at least one orifice positioned in the lower part and configured to place the internal and external zones in communication, and
　a liquid discharging system positioned at the orifice and configured to take up a closed state in which the liquid discharging system prevents the liquid from flowing from the internal zone to the external zone through the orifice and an open state in which the liquid discharging system allows the liquid to flow from the internal zone to the external zone through the orifice,
　wherein the liquid discharging system comprises at least one elastically deformable element configured to be deformed by the internal pressure of the internal zone of the enclosure and, depending on its deformation, to control the open or closed state of the liquid discharging system.

2. The enclosure according to claim 1,
　wherein the deformable element is a deformable membrane closing off the orifice and having at least one perforation passing through the deformable membrane,
　the deformable membrane being configured to deform depending on the internal pressure of the internal zone and to take up a non-deformed state and a deformed state in which the deformable membrane is stretched in a direction of the external zone of the enclosure,
　the deformable membrane being configured such that the perforation takes up a closed-off state when the deformable membrane is in the non-deformed state or when the deformable membrane is in the deformed state and the internal pressure of the internal zone of the enclosure is lower than a given first threshold pressure and an open state when the deformable membrane is in the deformed state and the internal pressure of the internal zone of the enclosure is greater than or equal to the first given threshold pressure.

3. The enclosure according to claim 2, wherein the deformable membrane is configured such that the perforation remains in the open state as long as the internal pressure of the internal zone of the enclosure remains greater than a second given threshold pressure, lower than the first given threshold pressure, and returns to the closed-off state as soon as the internal pressure of the internal zone of the enclosure is equal to or lower than the second given threshold pressure.

4. The enclosure according to claim 3, wherein the deformable membrane is made of elastomer.

5. The enclosure according to claim 2,
wherein the deformable membrane comprises a peripheral edge exhibiting a cross section larger than the cross section of the orifice and an overlapping zone pressed against the enclosure,
the at least one perforation of the deformable membrane being positioned in the overlapping zone so as to be closed off by the enclosure when the deformable membrane is in the non-deformed state and when the deformable membrane is in the deformed state and the internal pressure of the internal zone of the enclosure is lower than the first given threshold pressure,
the perforation being at least partially positioned in line with the orifice when the deformable membrane is in the deformed state and the internal pressure of the internal zone of the enclosure is greater than or equal to the first given threshold pressure.

6. The enclosure according to claim 2,
wherein the at least one perforation of the deformable membrane is positioned in line with the orifice when the deformable membrane takes up the non-deformed state, the perforation having:
a zero cross section that does not allow passage of the fluids contained in the enclosure when the deformable membrane is in the non-deformed state,
a non-zero cross section that allows the passage of the liquid when the deformable membrane is in the deformed state and the internal pressure of the internal zone of the enclosure is greater than or equal to the first given threshold pressure.

7. The enclosure according to claim 2, wherein the deformable membrane comprises a plurality of perforations passing through the deformable membrane, said perforations being distributed in a circle that is substantially centered with respect to the orifice.

8. The enclosure according to claim 1, wherein the liquid discharging system comprises a check valve configured to be movable between a closed position in which the check valve closes off the orifice and an open position in which the check valve is spaced apart from the enclosure and allows the liquid to flow towards the external zone of the enclosure, the elastically deformable element being a return element configured to keep the check valve in the closed position as long as the internal pressure of the internal zone of the enclosure is lower than a first given threshold pressure, and to allow the check valve to move into the open position as soon as the internal pressure of the internal zone of the enclosure is greater than or equal to the first given threshold pressure.

9. The enclosure according to claim 8, wherein the return element is configured such that the check valve remains in the open position as long as the internal pressure of the internal zone of the enclosure is greater than a second given threshold pressure lower than the first given threshold pressure and such that the check valve returns to the closed position as soon as the internal pressure of the internal zone of the enclosure is lower than or equal to the second given threshold pressure.

10. An aircraft comprising at least one enclosure according to claim 1.

* * * * *